(12) United States Patent
Santos

(10) Patent No.: US 6,515,471 B1
(45) Date of Patent: Feb. 4, 2003

(54) ABSOLUTE POSITION HALL STRING SENSOR

(75) Inventor: A. John Santos, Farmington, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/686,384

(22) Filed: Oct. 11, 2000

(51) Int. Cl.$^7$ ................ G01B 7/14; G01B 7/30
(52) U.S. Cl. ................ 324/207.2; 324/207.25
(58) Field of Search ............ 324/207.2, 207.12, 324/207.21, 207.25, 207.22, 225, 173; 341/13, 15, 10

(56) References Cited

U.S. PATENT DOCUMENTS

| | | | |
|---|---|---|---|
| 3,096,441 A | 7/1963 | Burkhardt | |
| 4,438,398 A | 3/1984 | Maruo et al. | 324/173 |
| 4,628,609 A | 12/1986 | Rieder et al. | 33/125 C |
| 4,736,187 A | 4/1988 | Kibrick et al. | 340/347 P |
| 4,914,566 A | 4/1990 | Steutermann | 364/167.01 |
| 4,928,089 A | 5/1990 | Gasiunas et al. | 340/870.31 |
| 4,942,394 A | 7/1990 | Gusiunas | 340/870.31 |
| 4,965,503 A | 10/1990 | Watanabe et al. | 318/671 |
| 4,970,511 A | 11/1990 | Mills | 341/13 |
| 4,991,125 A | 2/1991 | Ichikawa | |
| 4,999,623 A | 3/1991 | Affa | 341/13 |
| 5,029,304 A * | 7/1991 | Tolmie, Jr. | 341/15 |
| 5,091,643 A | 2/1992 | Okutani et al. | 250/231.14 |
| 5,258,735 A * | 11/1993 | Allwine, Jr. | 335/306 |
| 5,313,159 A | 5/1994 | Allwine, Jr. | 324/207.2 |
| 5,350,955 A | 9/1994 | Street | 307/515 |
| 5,438,330 A | 8/1995 | Yamazaki et al. | 341/11 |
| 5,461,293 A | 10/1995 | Rozman et al. | 318/603 |
| 5,491,633 A | 2/1996 | Henry et al. | 364/424.05 |
| 5,495,162 A | 2/1996 | Rozman et al. | 322/10 |
| 5,568,048 A | 10/1996 | Schroeder et al. | 324/207.21 |
| 5,574,445 A | 11/1996 | Maresca et al. | 341/10 |
| 5,646,523 A * | 7/1997 | Kaiser et al. | 324/207.2 |
| 5,712,574 A | 1/1998 | Street | 324/714 |
| 5,757,180 A * | 5/1998 | Chou et al. | 324/207.2 |
| 5,903,000 A | 5/1999 | Juniman | 250/231.13 |
| 5,912,541 A | 6/1999 | Bigler et al. | 318/600 |
| 5,920,248 A | 7/1999 | Travostino | 335/302 |
| 6,043,645 A * | 3/2000 | Oudt et al. | 324/207.2 |

FOREIGN PATENT DOCUMENTS

| JP | 08304113 | 11/1996 |
|---|---|---|

\* cited by examiner

*Primary Examiner*—Edward Lefkowitz
*Assistant Examiner*—Subhash Zaveri
(74) *Attorney, Agent, or Firm*—Michael Best & Friedrich LLP

(57) ABSTRACT

Two lines of magnets have the same length and are aligned side by side. The lines of magnets have different numbers of magnetic pole pairs and have equal line lengths. A first sensor determines a relative position between poles of a pole pair of the first line of magnets, and a second sensor determines a relative position between poles of a pole pair of the second line of magnets. A circuit compares the relative positions determined by the sensors to determine an absolute position of the first line of magnets.

18 Claims, 2 Drawing Sheets

ABSOLUTE POSITION HALL STRING SENSOR

BACKGROUND OF THE INVENTION

1. Field of the Invention

This invention relates generally to the use of magnetic sensors for determining the absolute position of a target having magnetic poles and, more particularly, to the use of multiple arrays, each having a plurality of magnetic sensors to determine the absolute position of the target.

2. Related Prior Art

In determining position of a target, multiple magnetic sensors have been placed in proximity to a multi-pole magnet. Previously, strings of Hall effect devices have been used to provide signals that are summed to produce a sine wave that is representative of the average magnetic field over the multi-pole magnet. Summing the signals from the sensor elements in the first half of the Hall string and subtracting the sum of the signals from the sensor elements in the second half of the Hall string produces a cosine wave. The sine/and cosine waves can then be used to determine the position of a target equipped with the multi-pole magnet.

Such devices are useful in reducing errors in determining position of the target that are due to variations in the magnetic fields or the spacing of the magnetic poles. However, these known devices and methods have requirements on the string of sensor devices. The requirement is that they have a length that is matched precisely to the pole spacing of the multi-pole magnet with which the magnetic sensors are to be used. In addition, errors can be caused by external magnetic fields. The external fields will bias the magnetic field by increasing the magnetic North poles and decreasing the magnetic South poles or visa versa. This will cause the sine and cosine curves to shift such that the zero points will not be regularly spaced. In either case, the signal processing of the sine and cosine waves produces errors in the position measurement.

Several United States patents have been issued illustrating the current art, for example, U.S. Pat. No. 5,029,304, titled "Sensor With Absolute Digital Output Utilizing Hall Effect Devices", issued to Robert J. Tolmie, Jr., et al. relates to a sensor for determining position or dimensions of an object that has an array of detectors and an actuating medium of the detectors configured to cause the detectors to output an absolute Gray binary code.

U.S. Pat. No. 5,574,445, titled "Digital Absolute Position Encoders", issued to Robert L. Maresca, et al., relates to a position encoder for determining the absolute position of a first member with respect to a second member. The absolute position is determined within a resolution cell of L/2$^n$ where n is an integer and L is a predetermined span. One of the members has a plurality of m tracks of binary indicia distributed over the predetermined span, L, where m is an integer less than n. The other member has a plurality of indicia detectors disposed on the second member for detecting the binary indicia. With such an arrangement, an encoder is provided having "a unit-distance code", yet uses less tracks than that used with a conventional Gray code encoder. The encoder also has a reduced number of transitions than that required on the track used with a conventional Gray code encoder.

The foregoing illustrates limitations known to exist in present devices and methods. Thus, it is apparent that it would be advantageous to provide an alternative directed to overcoming on or more of the limitations set forth above. Accordingly, a suitable alternative is provided including features more fully disclosed hereinafter.

SUMMARY OF THE INVENTION

The present invention provides an apparatus and method for determining the absolute position of a target. An absolute position sensor to determine the position of a target includes a first line of magnets having a first predetermined number of magnets and a second line of magnets aligned with the first line of magnets having a second predetermined number of magnets. The second predetermined number of magnets is different from the first predetermined number of magnets. A sensor for determining a position on each magnet of the first line of magnets is included. A sensor for determining a position on each magnet of the second line of magnets is also included. A circuit is provided for comparing the position on each magnet of the first line of magnets and the position on each magnet of the second line of magnets to determine an absolute position of the first line of magnets. By comparing the relative positions on the two lines of magnets, the position on the entire line of magnets can be determined by the amount of offset in the positioning of the magnets from each line.

The present invention also provides a method for determining an absolute position of a target. The method of the present invention includes providing a first line of magnets having a first predetermined number of magnets and a second line of magnets aligned with the first line of magnets. The second line of magnets has a second predetermined number of magnets different from the first predetermined number of magnets for the first line. A position on each magnet of the first line of magnets is determined. A position on each magnet of the second line of magnets is determined. The position on each magnet of the first line of magnets is compared with the position on each magnet of the second line of magnets to determine an absolute position of the first line of magnets.

DESCRIPTION OF THE PREFERRED EMBODIMENT

The present invention provides a method and apparatus for determining the absolute position of a target. The target may be positioned on a rotating shaft or anything similar. The importance of the rotational location is paramount and the exact point may be critical. The absolute position sensor of the present invention can be used to determine the exact location of rotation on the shaft or the exact location of any point on a moving object.

Figure 1:
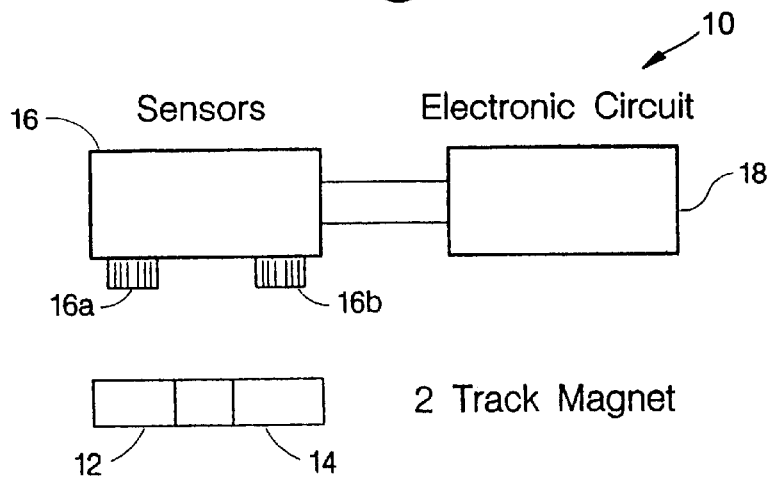
FIG. 1 is a plan view of a system for measuring the absolute position of a target.

An absolute position sensor 10 is used to determine the position of a target as illustrated in FIG. 1. Position sensor 10 includes a first line of magnets 12, a second line of magnets 14, a sensor 16 having Hall string sensors 16a and 16b, and electronic circuit 18 for processing the output of sensor 16.

Figure 2:
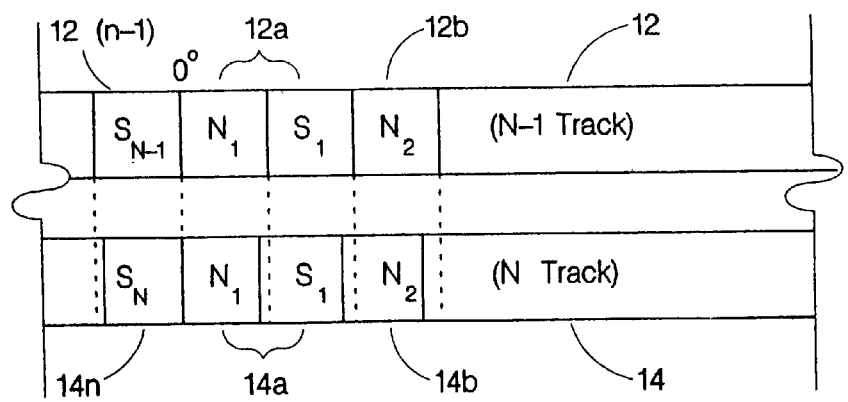
FIG. 2 is a plan view of a first embodiment of the present invention illustrating two lines of magnets laid end to end.

Referring now to FIG. 2, the arrangement of the two lines of magnets, line of magnets 12 and line of magnets 14, is illustrated. First line of magnets 12 has a first predetermined number of magnetic pole pairs, for example, a line of N−1 magnetic pole pairs 12a . . . 12N−1. A second line of magnets 14 is aligned with first line of magnets 12 having a second predetermined number of magnetic pole pairs, for example N magnetic pole pairs 14a . . . 14N. The second predetermined number of magnetic pole pairs is different from the first predetermined number of magnetic pole pairs. Both lines of magnets are exactly the same length, with different numbers of magnetic pole pairs in each line. This configuration provides the lines with coincidence at both the starting point and the ending point, but a progressively increasing offset of magnetic poles throughout the lineup. In the preferred embodiment the two predetermined numbers differ by 1, the first being N−1 and the second being N.

Figure 3:
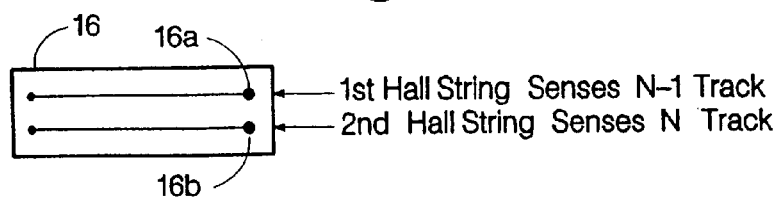
FIG. 3 is a plan view of the position of two Hall sensors used in FIG. 1 to determine the position of individual magnets in each line of magnets.

FIG. 3 illustrates a plan view of sensor 16, which is preferably a chip with a plurality of Hall sensors to determine magnetic flux at positions along line of magnets 12 and line of magnets 14. Sensor 16 includes Hall string sensor 16a for determining a relative position between poles of magnetic pole pairs 12a, . . . etc., of first line of magnets 12. Sensor 16 also includes Hall string sensor 16b for determining a relative position between poles of magnetic pole pairs 14a, . . . etc., of second line of magnets 14.

In operation, one track of magnets, for example, line of magnets 12, is used to produce a high considered the master track. This track, line of magnets 12, is used to produce a high resolution sensor signal. The signal detected by Hall string sensor 16a can be combined to produce outputs as each pole pair, 12a, . . . passes by the sensor. This effectively divides each pole pair on the N−1 track into signals that are 1/(N−1) of a pole pair length or finer.

Signals resulting form line of magnets 14 can be processed in a similar fashion with the goal of comparing the relative position of the second Hall string on its pole pair with the relative position of the first Hall string on its pole pair. The fact that each Hall string sensor 16a and 16b is detecting a series of pole pairs that do not have the same length and are aligned at only one position (Zero degrees) makes it possible to determine which pole pair is under the first Hall string sensor 16a. The phase shift of the signal detected by Hall string sensor 16a, will start at a value near zero and shift by (N−1)/N with each pole pair that passes until it shifts so far that it reaches 360 degrees after one complete revolution.

Circuit 18 is provided for comparing the position on each magnet of first line of magnets 12 and the position on each magnet of second line of magnets 14 to determine an absolute position of first line of magnets 12. By comparing the relative positions on the two lines of magnets, the position on the entire line of magnets can be determined by the amount of offset in the positioning of the magnets from each line. Electronic circuit 18 may be of any type currently in use in the art, the only requirement being that it is capable of receiving two inputs and providing an output indicating a caparison of the two inputs.

The absolute position of the high resolution signal can be determined by knowing which pole pair, 12a, . . . etc., is under sensor 16A. The electronics of electronic circuit 18 associated with the first Hall string, line of magnets 12, must be able to determine the absolute position within the pole pair currently under the sensor 16A.

By combining the information consisting of the absolute position of the pole pair, 12a, . . . etc., under the first Hall string sensor 16A with the identity of the pole pair, 12a, etc., under the first Hall string sensor 16A, a highly accurate absolute position can be determined over a complete revolution. From a practical standpoint it may be desirable to program an initial offset value to electrically trim the zero degree point where the N−1 and the N tract are coincident.

The present invention also provides a method for determining an absolute position of a target. The method of the present invention includes providing first line of magnets 12 having a first predetermined number of magnets and second line of magnets 14 aligned with first line of magnets 14. Both first line of magnets 12 and second line of magnets 14 are the same length. However, second line of magnets 14 also has a predetermined number of magnets, but it is different from the first predetermined number of magnets for first line of magnets 12. A position on each magnet, 12a, . . . etc., of first line of magnets 12 is determined. A position on each magnet, 14a, . . . etc., of second line of magnets 14 is determined. The position on each magnet of first line of magnets 12 is compared with the position on each magnet of second line of magnets 14 to determine an absolute position of first line of magnets 12.

Figure 4:
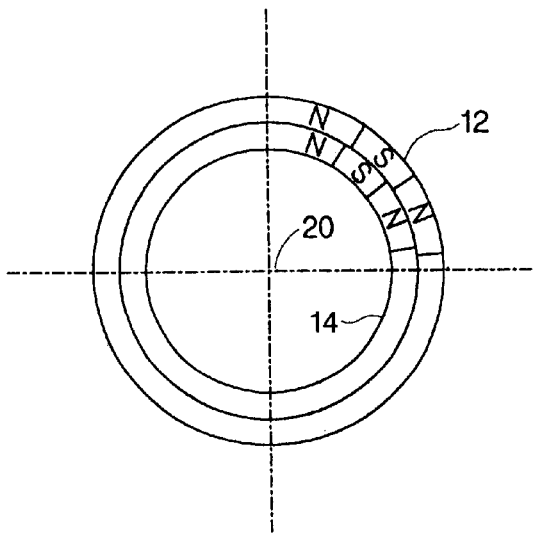
FIG. 4 is a plan view of an alternate embodiment of the present invention illustrating two lines of magnets configured as two concentric circles.

Referring now to FIG. 4, an alternate embodiment of the present invention is illustrated. Line of magnets 12 forms a circle with its center at point 20. Line of magnets 14 also forms a circle with its center at point 20. Line of magnets 12 and line of magnets 14 are laid side by side to form two concentric circles. Sensor chip 16 may be placed directly above line of magnets 12 and line of magnets 14 to take readings of magnetic flux as in the first embodiment. Electronic circuit 18 is also the same as in the first embodiment, a circuit capable of receiving two different outputs and producing a response or output indicative of the difference in the two inputs.

Figure 5:
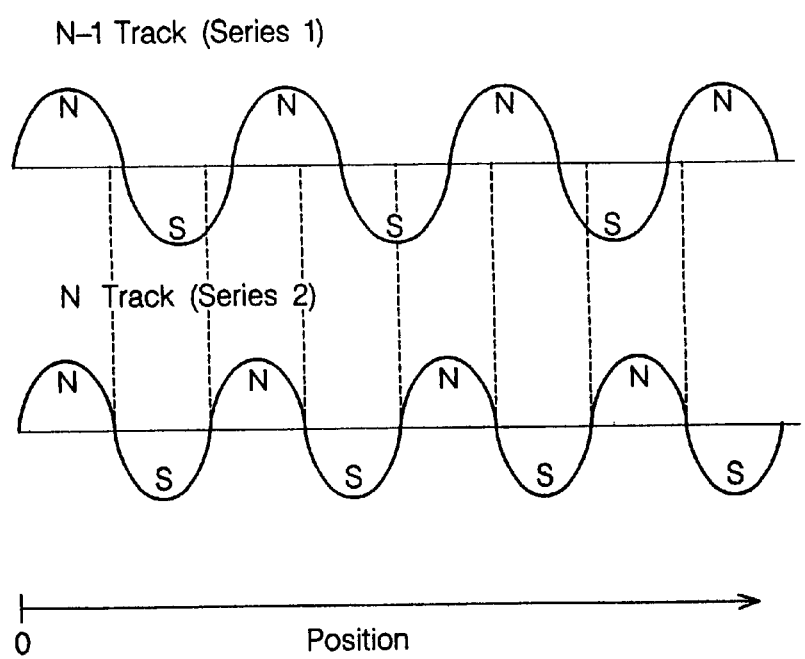
FIG. 5 is a graphical illustration of the nearly sinusoidal electrical output of the Hall sensors of FIG. 4.

FIG. 5 is a graphical illustration of the outputs of Hall string sensors 16A and 16B. As can be seen, the outputs are similar, the individual magnets, 12a, . . . etc., and 14a, . . . etc., in line of magnets 12 and line of magnets 14, respectively, being similar in shape and close to each other in size, with the size of the individual magnets varying only slightly from line of magnets 12 to line of magnets 14. However, it can be seen that the outputs of sensors 16A and 16B are slightly out of phase, the rise in electrical output of line of magnets 12 (N−1) lagging behind the rise in electrical output of line of magnets 14 (N). This is due to the increased length of magnets, 12a, . . . etc., in line of magnets 12 to cover the same length as line of magnets 14, but with fewer magnets ((N−1) as compared to N).

The present invention provides a Hall effect based speed and position sensor that also has the ability to detect absolute position. The use of two side by side linear or curved arrays of Hall sensors with each array detecting a magnetic track with unique positions and/or sized poles. This magnet and sensor combination will produce signals that contain the required information to determine the absolute position of the magnet over one revolution with a high degree of accuracy and repeatability.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

Having described the invention, what is claimed is:

1. An apparatus for sensing absolute position, the apparatus comprising:
    a first line of magnets having a first predetermined number of magnetic pole pairs and a first line length;
    a second line of magnets aligned with said first line of magnets having a second predetermined number of magnetic pole pairs and a second line length equal to the first line length, said second predetermined number being different from said first predetermined number such that a progressively changing offset of magnetic poles results;
    a first sensor for determining a relative position between poles of a pole pair of said first line of magnets;
    a second sensor for determining a relative position between poles of a pole pair of said second line of magnets; and
    a circuit for comparing said relative positions to determine an absolute position of said first line of magnets.

2. The apparatus according to claim 1 wherein said first line of magnets and said second line of magnets each have a linear configuration.

3. The apparatus according to claim 1 wherein said second predetermined number is one less than said first predetermined number.

4. The apparatus according to claim 1 wherein said second predetermined number is one greater than said first predetermined number.

5. The apparatus according to claim 1 wherein said first sensor comprises at least two Hall sensors.

6. The apparatus according to claim 5 wherein said second sensor comprises at least two Hall sensors.

7. The apparatus according to claim 1 wherein said first line of magnets and said second line of magnets each have a circular configuration and said lines of magnets form concentric circles.

8. The apparatus according to claim 7 wherein said second predetermined number is one less than said first predetermined number.

9. The apparatus according to claim 7 wherein said second predetermined number is one greater than said first predetermined number.

10. The apparatus according to claim 7 wherein said first sensor comprises at least two Hall sensors.

11. The apparatus according to claim 10 wherein said second sensor comprises at least two Hall sensors.

12. A method for determining absolute position, the method comprising:
    providing a first line of magnets having a first predetermined number of magnetic pole pairs and a first line length;
    providing a second line of magnets aligned with said first line of magnets having a second predetermined number of magnetic pole pairs and a second line length equal to the first line length, said second predetermined number being different from said first predetermined number such that a progressively changing offset of magnetic pole pairs results;
    determining a relative position between poles of a pole pair of said first line of magnets;
    determining a relative position between poles of a pole pair of said second line of magnets; and
    comparing said relative positions to determine an absolute position.

13. The method according to claim 12 wherein said first line of magnets and said second line of magnets each have a linear configuration.

14. The method according to claim 12 wherein said first line of magnets and said second line of magnets each have a circular configuration and said lines of magnets form concentric circles.

15. A method of determining absolute position comprising:
    providing two side by side lines of magnets, one line of magnets having a different number of magnetic pole pairs than the other line of magnets;
    determining a location of a first sensor relative to poles of a magnetic pole pair of one of the lines of magnets;
    determining a location of a second sensor relative to poles of a magnetic pole pair of the other of the lines of magnets; and
    comparing the said locations of the sensors relative to the magnetic pole pairs to determine absolute position of the lines of magnets with respect to the sensors.

16. The method according to claim 15 wherein the lines of magnets each have a linear configuration.

17. The method according to claim 15 wherein said lines of magnets each have a circular configuration and said lines of magnets form concentric circles.

18. An apparatus for determining absolute position, the apparatus comprising:
    a first line of magnets having a length and a first predetermined number of magnetic pole pairs;
    a second line of magnets having a length the same as the first line of magnets and a second predetermined number of magnetic pole pairs different from said first predetermined number such that a progressively changing offset of magnetic pole pairs results;
    Hall sensors for determining relative positions of the Hall sensors with respect to poles of the first and second lines of magnets; and
    a circuit to compare said relative positions to determine absolute position of the Hall sensors with respect to said first line of magnets.

* * * * *

UNITED STATES PATENT AND TRADEMARK OFFICE
CERTIFICATE OF CORRECTION

PATENT NO. : 6,515,471 B1
DATED : February 4, 2003
INVENTOR(S) : A. John Santos

It is certified that error appears in the above-identified patent and that said Letters Patent is hereby corrected as shown below:

Title page,
Item [54], change the title from "ABSOLUTE POSITION HALL STRING SENSOR" to -- APPARATUS AND METHOD FOR SENSING ABSOLUTE POSITION --.

Column 3,
Line 32, delete "is used to produce a high", and replace with -- can be --.
Line 39, delete "form" and replace with -- from --.
Line 48, after "detected by", insert -- the second Hall string sensor 16b, when compared with the first string signal detected by --.

Signed and Sealed this

Twenty-fifth Day of March, 2003

JAMES E. ROGAN
*Director of the United States Patent and Trademark Office*